United States Patent
Müller

(10) Patent No.: US 6,179,606 B1
(45) Date of Patent: Jan. 30, 2001

(54) ARRANGEMENT FOR A LATCH LOCK FOR MOULDING TOOLS

(76) Inventor: Hans Müller, Pejlingsvägen 6, S-50279 Frufällan (SE)

( * ) Notice: Under 35 U.S.C. 154(b), the term of this patent shall be extended for 0 days.

(21) Appl. No.: 09/075,438

(22) Filed: May 11, 1998

(30) Foreign Application Priority Data

May 9, 1997 (SE) .................................................. 9701725

(51) Int. Cl.⁷ .................................................. B29C 45/64
(52) U.S. Cl. .................... 425/556; 164/342; 425/192 R; 425/451.9; 425/595
(58) Field of Search .............................. 425/192 R, 450.1, 425/451.9, 556, 589, 595; 164/339, 342

(56) References Cited

U.S. PATENT DOCUMENTS

| | | | |
|---|---|---|---|
| 3,986,805 | * 10/1976 | Haines | 425/590 |
| 4,561,626 | * 12/1985 | Black | 425/595 |
| 4,671,764 | * 6/1987 | Hehl | 425/595 |
| 5,494,435 | * 2/1996 | Vandenberg | 425/589 |

* cited by examiner

Primary Examiner—James P. Mackey

(57) ABSTRACT

The invention relates to a latch lock (1) for a tool (2) used in the injection moulding of plastics or the die-casting of metals having a moving element (A) such as a mould plate or similar intended, after having been displaced for a certain distance, to be locked in the attained position prior to any subsequent actuation. According to the invention, an axially slotted sleeve (3) is so arranged as to accommodate internally a connecting piece (4) exhibiting radially projecting drawing wings (5) that are attached to a tool plate (B) and are movably guided by the slots (6, 7) in the sleeve along the sleeve (3). An end closure (9) attached to a tool plate (A) is also detachably attached to the guiding slotted sleeve (3).

5 Claims, 4 Drawing Sheets

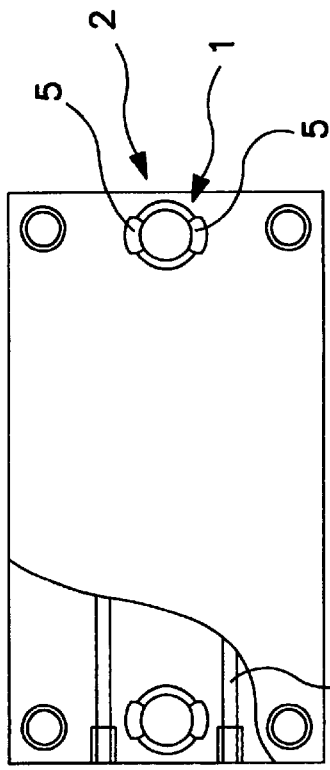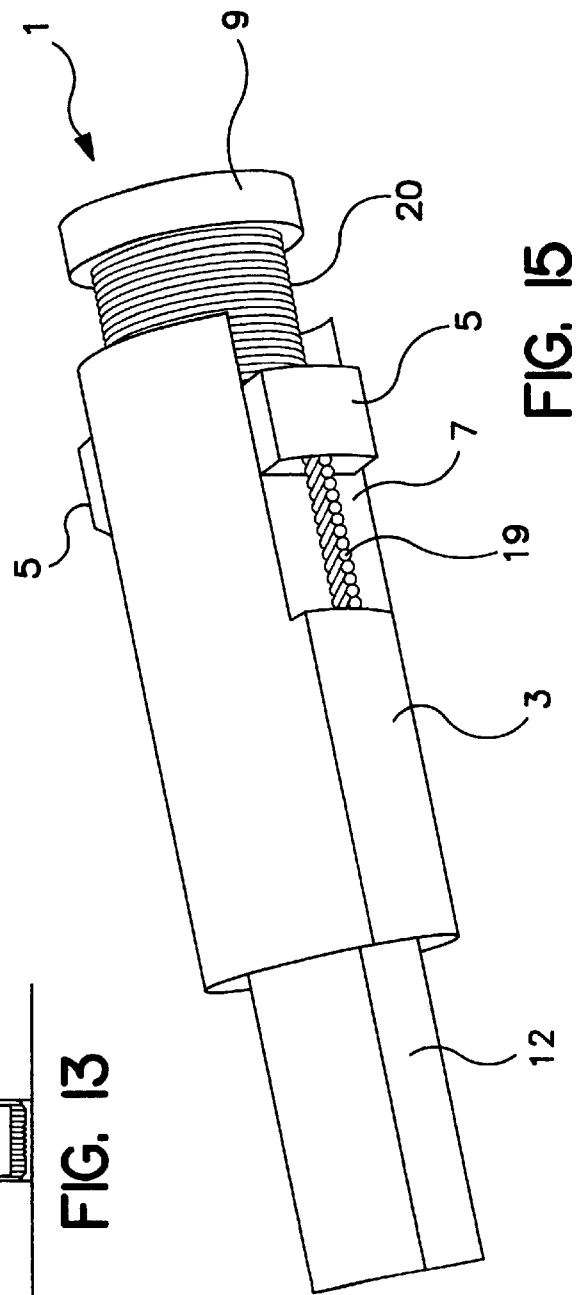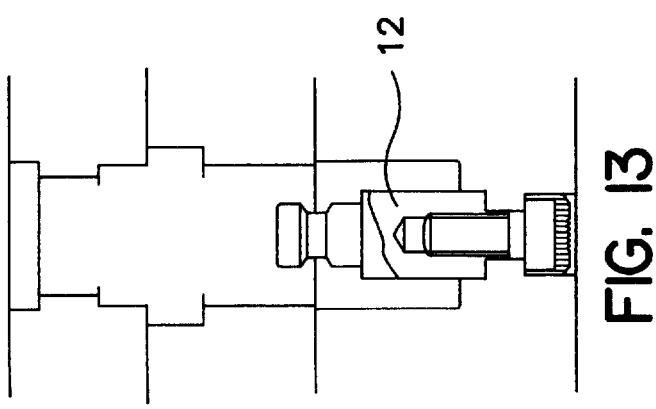

ARRANGEMENT FOR A LATCH LOCK FOR MOULDING TOOLS

BACKGROUND OF THE INVENTION

The present invention relates to an arrangement for a latch lock for a tool used in the injection moulding of plastics or the die-casting of metals having a moving element such as a mould plate or similar intended, after having been displaced for a certain distance, to be locked in the attained position prior to any subsequent actuation.

An arrangement for an injection moulding tool is previously disclosed in, for example, Swedish Patent Application 9002829-1. The constituent parts in this case are designed and assembled in a particular manner. It has been found that manufacture and assembly should be capable of taking place in a more rational and functional manner, in conjunction with which certain advantages relating to the function are demanded by those who use the moulding tools.

SUMMARY OF THE INVENTION

The principal object of the present invention is thus, in the first place, to attempt by simple means to satisfy the aforementioned wishes in an effective and efficiently functioning manner without the need for complicated or cost-increasing measures.

Said object is achieved by means of a latch lock in accordance with the present invention, which is characterized essentially in that an axially slotted sleeve is so arranged as to accommodate internally a connecting piece exhibiting radially projecting drawing wings that are attached to a tool plate and are movably guided along the sleeve by the slots in the sleeve, and in that an end closure that is attached to a tool plate is detachably attached to the guiding slotted sleeve.

DESCRIPTION OF THE DRAWINGS

The invention is described below with reference to the accompanying drawings as a number of preferred illustrative embodiments, of which

FIG. 13 shows a further illustrative embodiment of an end attachment of a pin;

FIG. 14 shows a plan view of a tool plate as a partly cut-away section, which exhibits a latch lock in accordance with the invention; and FIG. 15 shows a perspective view of a latch lock in accordance with the invention, in this case disconnected.

DETAILED DESCRIPTION OF THE INVENTION

Figure 2:
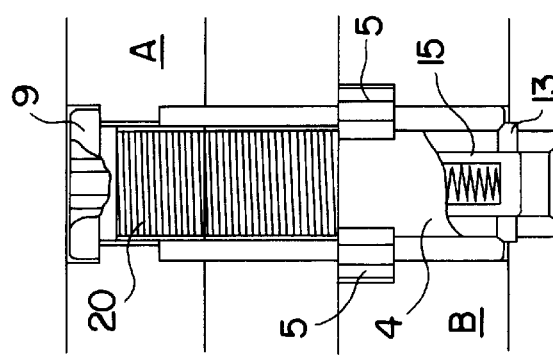
FIG. 2 shows the rear part of the latch lock in an extended position.

A latch lock 1 in accordance with the present invention for a tool 2 for use in the injection moulding of plastics or the die-casting of metals having a moving element A-D, such as mould plate or similar, intended, after having been displaced for a certain distance, to be locked in the attained position prior to any subsequent actuation, comprises an axially slotted sleeve 3. This sleeve 3 is so arranged as to accommodate internally a connecting part 4 exhibiting two or more radially projecting drawing wings 5. These drawing wings 5 are attached to a rear tool plate B and are movably guided by the slots 6, 7 in the sleeve in a direction 8 along the longitudinal extent of the sleeve. An end closure 9 is attached to one end A of the tool plates and is detachably attached to the guiding slotted sleeve 3 at its outer end 3A.

The sleeve 3, which is slotted at its rear free end 3A, in this way constitutes an end stop for a return sleeve 10 that is used on appropriate occasions, which return sleeve is securely attached at one end 10A to an ejector pin plate D, for example by means of a flange 11 that is securely clamped in a recess between the parts D1, D2 of the plate. Guiding of the ejector pin plate D is so arranged as to be achieved by means of the return sleeve 10.

Figure 1:
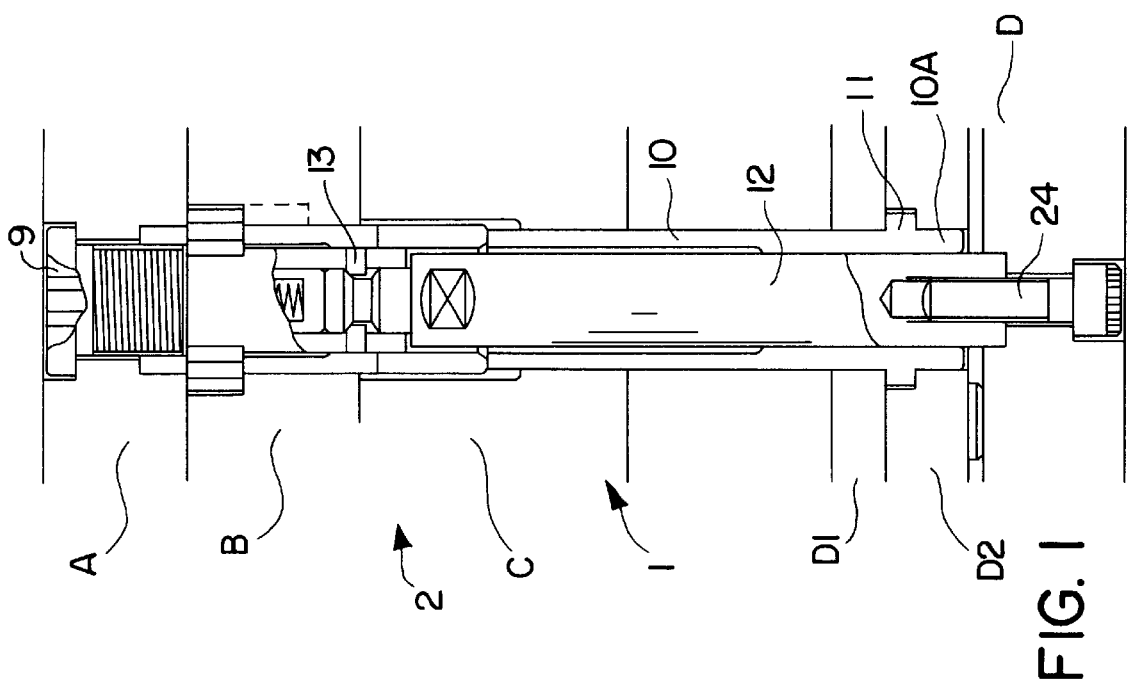
FIG. 1 shows a sectioned view of built-in latch lock in accordance with the present invention in an initial position.
Figure 3:
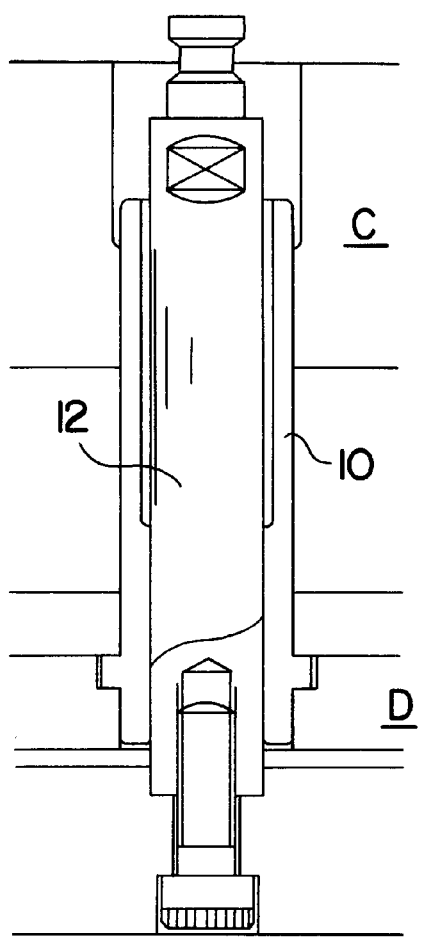
FIG. 3 shows the front part of the latch lock in the extended position.
Figure 4:
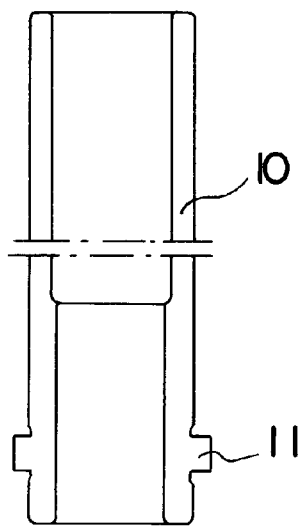
FIG. 4 shows a sectioned view of a return sleeve.
Figure 5:
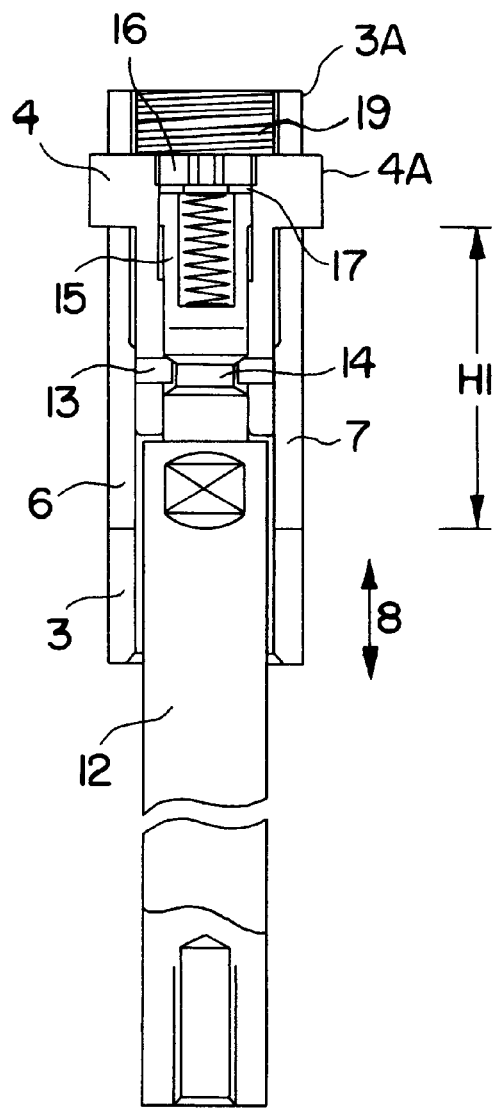
FIG. 5 shows a sectioned view of a part of the tool in its assembled position.
Figure 6:
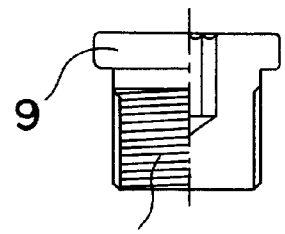
FIG. 6 shows the rear end of the tool.
Figure 7:
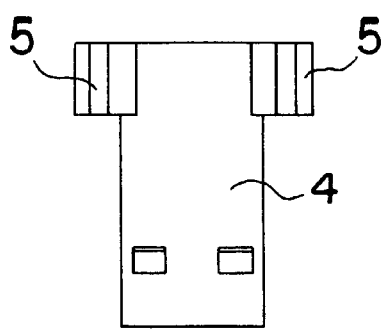
FIG. 7 shows a drawing wing attachment part viewed from the side.
Figure 8:
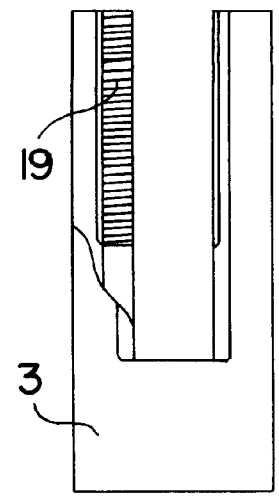
FIG. 8 shows a sleeve in partly sectioned view.
Figure 9:
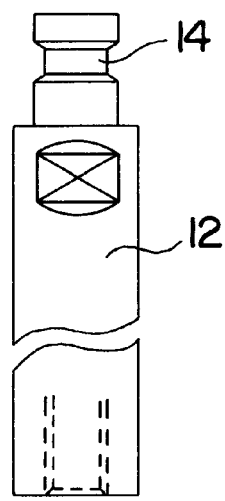
FIG. 9 shows a pin viewed from the side.
Figure 10:
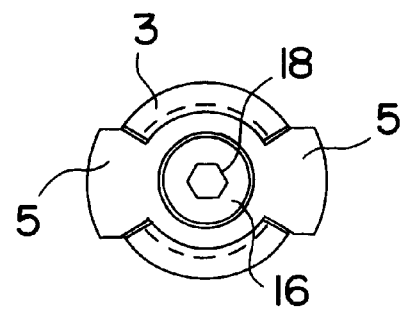
FIG. 10 shows an end view of the assembly of the tool illustrated in FIG. 5.

A pin 12 or similar moving part is accommodated preferably internally within a return sleeve 10 of the aforementioned kind, as illustrated in FIG. 1, or freely without an enclosing part, and is detachably attachable to the slotted sleeve 3 via the connecting piece 4 by means of radially moving locking jaws 13, which are capable of being accommodated in an annular recess 14 in the piston 12 and are so arranged as to be actuated and to function in a previously disclosed manner.

The pin 12 is capable of interacting with a spring-actuated piston 15, which is accommodated in a displaceably movable fashion internally in the connecting part 4 in a direction away from a threaded holding part 16 that is capable of being screwed securely inside a cavity 17 at the rear end 4A of the connecting part. A hexagonal hole 18 in this nut-like part 16 permits assembly in the cavity 17 therein.

The slotted sleeve 3 exhibits an internally threaded part 19 at the rear end 3A of the sleeve, which is capable of interacting with the external threads 20 on the screw-like end closure 9.

The function of the latch lock 1 for a moulding tool described above is as follows:

The latch lock is intended to draw an intermediate plate B, C in the moulding tool 2 before the tool opens in its customary parting plane. It can be installed with a delay.

To enable space to be provided for cooling ducts 21 in particular, the tool can be provided with a return sleeve 10 of the aforementioned kind in place of ordinary round return pins. The aforementioned return sleeve 10 also functions as a guide element for the ejector pin plates D1, D2, both longitudinally and laterally. To achieve the desired stroke length H1, the parts 3, 12 and 10 can be shortened to the desired extent.

Figure 11:
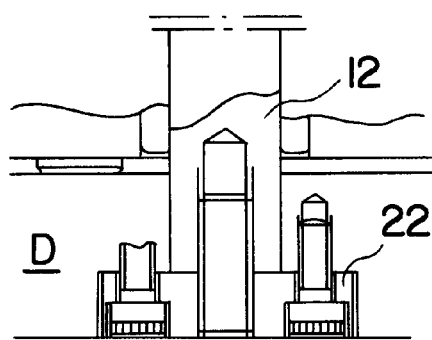
FIG. 11 shows an end connection of a tool plate with a pin.
Figure 12:
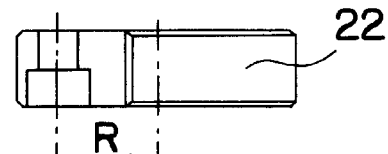
FIG. 12 shows an attachment end plate in partly sectioned view.

If it is wished for the pin 12 to be installed without free play, it is possible to use an attachment plate 22 that is screwed securely into a plate D, as shown in FIG. 11.

The following are important design points:

The drawing wings 5 of the connecting part 4 are executed in a single piece with it. In this way, a fixed stroke limit H1 is achieved in the sleeve 3 for the tool plate, and locking of the drawn plate is achieved by means of the piston 15.

Small installation dimensions and a large stroke range H1 are possible. A regulated installation height is achieved by shortening the sleeve 3. Secure attachment of this sleeve 3 is achieved by means of the screw 9, which is accommodated in a recess 23 in the plate A and prevents deflection of the sleeve 3.

Attachment of the pin 12 at a full right angle can be achieved through interaction with the attachment part 22. A fixing screw 24 is broken off in the event of overloading, thereby preventing damage to other parts.

FIG. 13 shows a variant of the attachment that makes it possible to prevent the return of ejector pin plates. In this case the pin 12 is attached directly to the mould plate.

Depending on its design, the latch lock 1 can be fitted both to the fixed and to the moving halves of he mould, and the material used in the arrangement 1 can be carbonitrided tool steel with up to HRC 64, 0.3 depth at the surface and ~HRC 46 in the core, in order to combine wear resistance with the highest possible strength and to achieve small installation dimensions.

The invention is not restricted to the illustrative embodiments described above and illustrated in the drawings, but may be varied within the scope of the Patent Claims without departing from the idea of invention.

What is claimed is:

1. A latch lock for a tool used in the injection molding of plastics or the die casting of metals having a displaceable moving element which is lockable along its axis of movement comprising:

a sleeve, a connecting piece, an end closure, a return sleeve, said sleeve having axial slots, said connecting piece accommodated internally in said sleeve, said connecting piece having radially projecting drawing wings attached to a first tool plate and movably guided by said axial slots, said end closure is attached to a second tool plate and detachably attached to said sleeve, said sleeve constitutes an end stop for said return sleeve, said return sleeve is attached to a back ejector pin plate, and the guiding of said ejector pin plate is achieved by means of said return sleeve.

2. A latch lock as claimed in claim 1, wherein a pin is moveably accommodated internally within said return sleeve and is detachably attachable to said sleeve.

3. A latch lock as claimed in claim 2, wherein said pin is attachable to said connecting piece by means of radially moving locking jaws, which are capable of being accommodated in an annular recess in said pin.

4. A latch lock as claimed in claim 2, wherein said pin is capable of interacting with a spring-actuated piston, which is accommodated internally in said connecting piece.

5. A latch lock as claimed in claim 2, wherein said sleeve exhibits an internally threaded part which is capable of interacting with threads on said end closure.

* * * * *